(12) United States Patent
Choi et al.

(10) Patent No.: US 7,662,513 B2
(45) Date of Patent: *Feb. 16, 2010

(54) NEGATIVE ELECTRODE ACTIVE MATERIAL FOR LITHIUM-BASED SECONDARY BATTERY AND METHOD OF PREPARING SAME

(75) Inventors: Wan-uk Choi, Chonan (KR); Jae-yul Ryu, Suwon-si (KR); Sang-Young Yoon, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/792,305

(22) Filed: Feb. 23, 2001

(65) Prior Publication Data

US 2002/0127172 A1    Sep. 12, 2002

(51) Int. Cl.
  H01M 4/58    (2006.01)
  C01B 31/02   (2006.01)
  C01B 31/04   (2006.01)

(52) U.S. Cl. ............. 429/231.4; 423/231.4; 423/231.8; 423/218.1; 423/448; 423/445 R

(58) Field of Classification Search ............. 429/231.4, 429/231.8, 218.1; 423/445 R, 448
See application file for complete search history.

(56) References Cited

U.S. PATENT DOCUMENTS

| | | | | |
|---|---|---|---|---|
| 4,968,527 A | * | 11/1990 | Yoshimoto et al. | 427/122 |
| 5,153,082 A | * | 10/1992 | Ogino et al. | 429/194 |
| 5,340,670 A | | 8/1994 | Takami et al. | |
| 5,344,724 A | * | 9/1994 | Ozaki et al. | 429/94 |
| 5,426,006 A | * | 6/1995 | Delnick et al. | 429/221 |
| 5,436,092 A | | 7/1995 | Ohtsuka et al. | |
| 5,910,383 A | * | 6/1999 | Hase et al. | 429/231.4 |
| 6,139,990 A | * | 10/2000 | Kubota et al. | 429/231.8 |

FOREIGN PATENT DOCUMENTS

| | | | |
|---|---|---|---|
| JP | 05-307958 | | 11/1993 |
| JP | 06-318459 | | 11/1994 |
| JP | 07 073868 A | * | 5/1995 |
| JP | 07-169458 | | 7/1995 |
| JP | 07-296814 | | 11/1995 |
| JP | 07-320722 | | 12/1995 |
| JP | 10-226505 | | 8/1998 |

OTHER PUBLICATIONS

Cullity, Elements of X-Ray Diffraction, $2^{nd}$ edition, p. 401 section 14-4 1998 (no month).*

(Continued)

*Primary Examiner*—Patrick Ryan
*Assistant Examiner*—Helen O Chu
(74) *Attorney, Agent, or Firm*—Christie, Parker & Hale, LLP

(57) ABSTRACT

A negative electrode active material for a lithium-based secondary battery includes a graphite-like carbon material having an intensity ratio I(110)/I(002) of an X-ray diffraction peak intensity I(002) at a (002) plane to an X-ray diffraction peak intensity I(110) at a (110) plane of less than 0.2.

2 Claims, 1 Drawing Sheet

OTHER PUBLICATIONS

Cullity, "Elements of X-Ray Diffraction, Second Edition", Addison Wesley Publishing, p. 401, section 14-4. (No month available.), 1978.*

Cullity, "Elements of X-Ray Diffraction, Second Edition", Addison Wesley Publishing, p. 401, section 14-4. (No month available.).

Patent Abstracts of Japan, Publication No. 05-307958, Nov. 19, 1993, Matsushita Electric Ind. Co., Ltd.

Patent Abstracts of Japan, Publication No. 06-318459, Nov. 15, 1994, Toshiba Corp.

Patent Abstracts of Japan, Publication No. 07-169458, Jul. 4, 1995, Kawasaki Steel Corp.

Patent Abstracts of Japan, Publication No. 07-296814, Nov. 10, 1995, Kureha Chem Ind. Co., Ltd.

Patent Abstracts of Japan, Publication No. 07-320722, Dec. 8, 1995, Shin Kobe Electric Mach. Co., Ltd.

Patent Abstracts of Japan, Publication No. 10-226505, Aug. 25, 1998, Sumitomo Metal Ind., Ltd.

* cited by examiner

NEGATIVE ELECTRODE ACTIVE MATERIAL FOR LITHIUM-BASED SECONDARY BATTERY AND METHOD OF PREPARING SAME

CROSS REFERENCE TO RELATED APPLICATION

This application claims priority to Korean patent application No. 97-41937 filed Aug. 28, 1997, the content of which is incorporated herein by reference as if set forth in full.

BACKGROUND OF THE INVENTION (a) Field of the Invention

The present invention relates to a negative electrode active material for a lithium-based secondary battery and a method of preparing the same and, more particularly, to a negative electrode active material serving to fabricate a lithium-based secondary battery having a high capacity.

(b) Description of the Related Art

In recent years, the development of miniaturized portable electronics provokes needs for the secondary battery having a high capacity as well as a light weight. From the viewpoint of the capacity improvement per unit weight, the lithium-based secondary battery is preferably adopted because lithium has a high standard potential as well as a low electrochemical equivalent weight.

FIG. 2 is a schematic cross sectional view showing the general structure of the lithium-based secondary battery. As shown in FIG. 2, the lithium-based secondary battery includes a positive electrode plate 40 having a collector 1 made of nickel and an active material layer 10 coated on the collector 1, a negative electrode plate 45 having a collector 1' made of copper and an active material layer 30 coated on the collector 1', and a separator 25 interposed between the positive and negative electrode plates 40 and 45. The positive and negative electrode plates 40 and 45 essentially form an electrode plate assembly together with the separator 25. The electrode plate assembly is inserted into an opening portion of a battery case 5 internally surrounded with a gasket 20 while receiving an electrolyte 15 therein. The opening portion of the battery case 5 is covered by a cap 35.

Lithium-containing transition metal oxides such as $LiCoO_2$, $LiNiO_2$, $LiMn_2O_4$ and $LiNi_xCo_{1-x}O_y$ are preferably selected for the positive electrode active materials in conjunction with a polyethylene-based porous film for the separator.

As for the negative electrode active materials, lithium metal is attractive because it has a light weight and high capacity per unit weight to thereby output high voltage in the battery use. However, the use of lithium metal for the negative electrode material reveals serious defects in a cycle life and stability of the battery because the lithium metal is highly reactive with the electrolytic solvent and easily forms needle dentrites during cycling, causing destruction of the separator and a short circuit. In order to avoid the defects, lithium alloys are employed as the negative electrode active material instead of the lithium metal but yet reveals similar problems.

Alternatively, carbon materials, which can reversibly accept and donate significant amounts of lithium without affecting their mechanical and electrical properties, are proposed for the negative electrode active material.

The carbon materials adapted for the battery use can be divided into an amorphous carbon material and a crystalline carbon material.

When the amorphous carbon material is used for the negative electrode, the charge and discharge capacity is high but irreversible reactions are frequently generated and flatness in output voltage is poor compared to the crystalline carbon material. On the contrary, when the crystalline carbon material is used for the negative electrode, flatness in output voltage as well as the cycle life is good and the discharge/charge efficiency is high. But, the charge and discharge capacity is poor compared to the amorphous carbon material. Among them, the crystalline carbon material, i.e., the graphite-like carbon material has been preferably adopted for the negative electrode active material and trial has been made to increase its charge and discharge capacity.

Meanwhile, even the graphite-like carbon material has only a partial crystalline structure or a complicated structure of crystalline portions and amorphous portions.

Therefore, U.S. Pat. No. 5,436,092 discloses a technique of controlling a ratio of crystallinity by separating the X-ray diffraction peaks at the (002) plane and the (10) plane, being a combination of (100) plane and (101), into a crystalline component and an amorphous component.

Furthermore, U.S. Pat. No. 5,340,670 discloses a technique of controlling the intensity ratio I(101)/I(100) of the X-ray diffraction peak at the (100) plane to the X-ray diffraction peak at the (101) plane.

In the meantime, U.S. Pat. No. 5,344,724 discloses a technique of controlling the graphitization degree of the graphite-like carbon material.

However, the aforementioned techniques does not satisfactorily improve the charge and discharge capacity of the graphite-like carbon material.

SUMMARY OF THE INVENTION

It is an object of the present invention to provide a negative electrode active material serving to fabricate a lithium-based secondary battery having a high capacity.

In order to achieve this object and others, the present invention provides a negative electrode active material including a graphite-like carbon material having an intensity ratio I(110)/I(002) of an X-ray diffraction peak intensity I(002) at a (002) plane to an X-ray diffraction peak intensity I(110) at a (110) plane of less than 0.2.

A method of preparing an negative electrode active material for a lithium-based secondary battery includes the steps of dissolving a coal tar pitch or a petroleum pitch in an organic solvent to remove insoluble components therefrom, heat-treating the pitch at a temperature in the range of 400 to 450° C. for 30 minutes or more under an inert atmosphere to thereby produce mesophase particles, stabilizing or coking the mesophase particles, carbonizing the stabilized or coked mesophase particles at a temperature in the range of 1,000 to 1,300° C., and graphitizing the carbonized mesophase particles at a temperature in the range of 2,500 to 3,000° C. to thereby form a graphite-like carbon material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
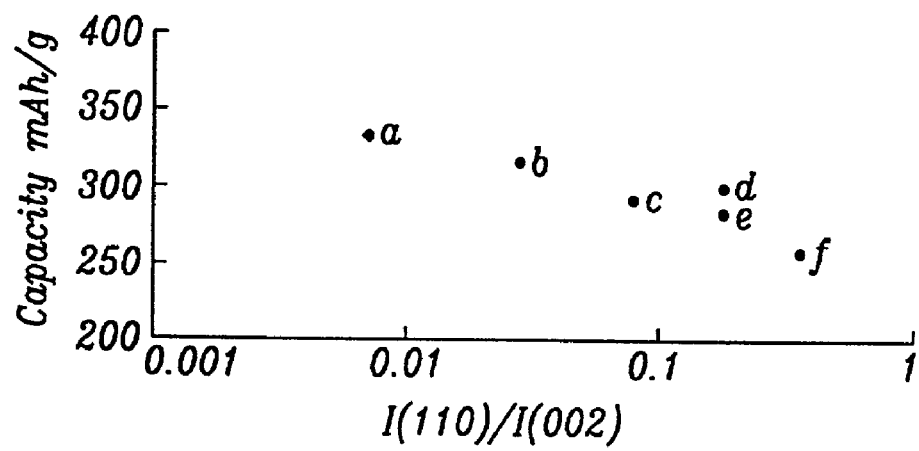
FIG. 1 is a graph showing variation in capacity of negative electrode active materials as a function of I(110)/I(002)
Figure 2:
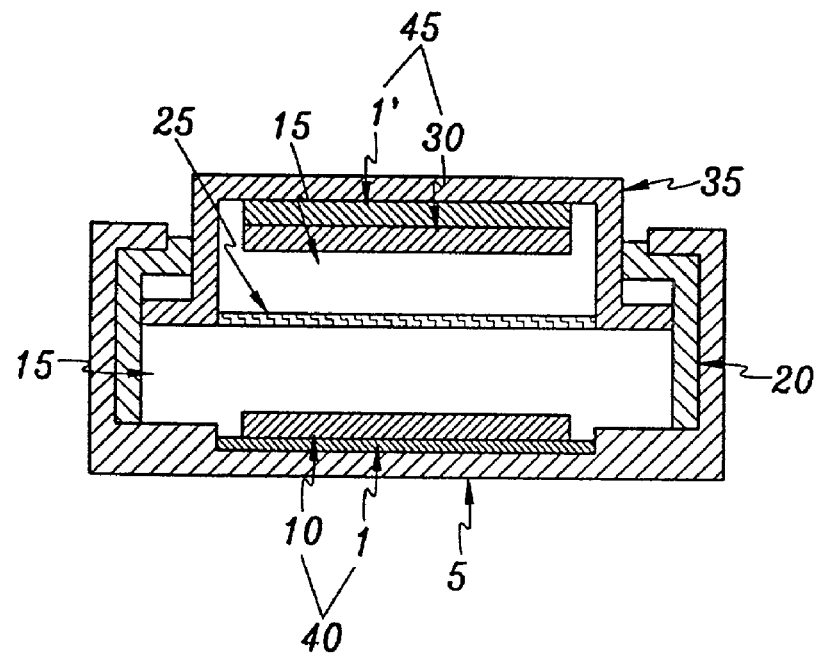
FIG. 2 is a schematic diagram of a 2016 typed coin cell.

The negative electrode active material for the lithium-based secondary battery according to the present invention includes a graphite-like carbon material which has an intensity ratio I(110)/I(002) of an X-ray diffraction peak intensity I(002) at a (002) plane to an X-ray diffraction peak intensity I(110) at a (110) plane of less than 0.2.

The graphite-like carbon material more preferably has an intensity ratio I(110)/I(002) of less than about 0.04. That is, the lower the intensity ratio of the intensity at the (002) plane to the intensity at the (110) plane, which reveal crystallinity during X-ray diffraction analysis, the higher the capacity of the graphite-like carbon material.

A method of preparing the negative electrode active material includes the steps of dissolving a coal tar pitch or a petroleum pitch in an organic solvent to remove insoluble components therefrom, heat-treating the pitch at a temperature in the range of 400 to 450° C. for 30 minutes or more under an inert atmosphere to thereby produce small spherical particles having an optical anisotropy (referred to hereinafter more simply as mesophase particles), stabilizing or coking the mesophase particles, carbonizing the stabilized or coked mesophase particles at a temperature in the range of 1,000 to 1,300° C., and graphitizing the carbonized mesophase particles at a temperature in the range of 2,500 to 3,000° C. to thereby form a graphite-like carbon material.

In the above method, the inert atmosphere is preferably a gaseous nitrogen or argon atmosphere and the mesophase particles are produced by 10~98 weight percent of the pitch.

The stabilizing step is preferably performed at a temperature in the range of 20 to 30° C. higher than a softening point. In case the stabilizing step is performed at temperatures exceeding 30° C. higher than the softening point, the structure or component of the produced mesophase particles is changed as well as entanglement among the particles can be occurred. On the contrary, in case the stabilizing step is performed at temperatures below 20° C. higher than the softening point, deterioration in stabilizing efficiency is resulted.

The coking step is preferably performed at a rising temperature up to 600° C. under an inert atmosphere.

The carbonizing step is preferably performed at a temperature in the range of 1,000 to 1,300° C. The carbonizing step is to remove components such as H, N and O from the stabilized or coked material. The components are not well removed at temperatures lower than 1,000° C. On the contrary, when the carbonizing step is performed at temperatures exceeding 1,300° C., the fine structure is significantly developed, causing reduction in the charge and discharge capacity.

The graphitizing step is preferably performed at a temperature in the range of 2,500 to 3,000° C. The graphitizing step is to arrange the fine structure of the carbonized material. In case the graphitizing step is performed at temperatures below 2,500° C., the crystalline structure is not well developed and amorphous portions may be present. On the contrary, when the graphitizing step is performed at temperatures exceeding 3,000° C., the value of I(110)/I(002) greatly increases and the charge and discharge capacity is undesirably low.

In the present invention, the graphite-like carbon materials having a high capacity is prepared by comparing an integral intensity I(002) of the X-ray diffraction peak at the (002) plane with an integral intensity I(110) of the X-ray diffraction peak at the prismatic plane (110). That is, the main point of the present invention is posed on the twist of carbon atoms in an unit lattice of the crystalline structure, rather than on the contributing effect to the electric capacity by separating the crystalline portion and the amorphous portion. Furthermore, in case the value of I(110)/I(002) is low, the identical effect can be obtained irrespective of crystallinity. The graphite-like carbon material for use in the present invention has a crystal size in the direction of the c axis (Lc) of 10~100 nm and in the direction of the a axis (La) of 20~200 nm, and a specific surface of 3~20 m²/g.

The fine structure of the synthesized carbon material is changed in accordance with the preparing conditions and reveals difference to a natural graphite. The experimental tests exhibited that the lower the intensity ratio of the (002) plane to the (110) plane which reveal a crystallinity during X-ray diffraction analysis, the higher the capacity of the graphite-like carbon material. Therefore, a lithium secondary battery having a high capacity can be fabricated with a graphite-like carbon material having a low intensity ratio of the (002) plane to the (110) plane for the negative electrode active material.

The present invention will be now described with reference to Examples and drawing.

EXAMPLE 1

A coal tar pitch was dissolved in terahydrofuran (THF) and insoluble components were removed therefrom. The residual components were heat-treated at 430° C. for 2 hours under a gaseous nitrogen atmosphere to thereby produce 10 weight percent of mesophase particles based on the pitch. Thereafter, the produced mesophase particles were further heat-treated at 250~300° C. for 2 hours in air to stabilize them. The stabilized mesophase particles were then carbonized at 1,000° C. under a gaseous nitrogen atmosphere. Next, the carbonized mesophase particles are graphitized at 2800° C. for 30 minutes under an inert atmosphere such as gaseous nitrogen/argon atmosphere. As a result, a carbon material having a graphite structure was prepared.

EXAMPLE 2

A petroleum pitch was dissolved in THF and insoluble components were removed therefrom. The residual components were heat-treated at 430° C. for 2 hours under a gaseous nitrogen atmosphere to thereby produce 10 weight percent of mesophase particles based on the pitch. Thereafter, the produced mesophase particles were heated at a rising temperature up to 600° C. under a gaseous nitrogen atmosphere to thereby coke them. The coked mesophase particles were then carbonized at 1,800° C. under a gaseous nitrogen atmosphere. Next, the carbonized mesophase particles were graphitized at 2800° C. for 30 minutes under an inert atmosphere such as gaseous nitrogen/argon atmosphere. As a result, a carbon material having a graphite structure was prepared.

EXAMPLE 3

A coal tar pitch was dissolved in THF and insoluble components were removed therefrom. The residual components were heat-treated at 430° C. for 15 hours under a gaseous nitrogen atmosphere to thereby produce 98 weight percent of mesophase particles based on the pitch. Thereafter, the produced mesophase particles were further heat-treated at 250~300° C. for 2 hours in air to stabilize them. The stabilized mesophase particles were then carbonized at 1,000° C. under a gaseous nitrogen atmosphere. Next, the carbonized mesophase particles were graphitized at 2800° C. for 30 minutes under an inert atmosphere such as gaseous nitrogen/argon atmosphere. As a result, a carbon material having a graphite structure was prepared.

EXAMPLE 4

A petroleum pitch was dissolved in THF and insoluble components were removed therefrom. The residual components were heat-treated at 430° C. for 15 hours under a gaseous nitrogen atmosphere to thereby produce 98 weight percent of mesophase particles based on the pitch. Thereafter, the produced mesophase particles were heated at a rising temperature up to 600° C. under a gaseous nitrogen atmosphere to coke them. The coked mesophase particles were then carbonized at 1,000° C. under a gaseous nitrogen atmosphere. Next, the carbonized mesophase particles were graphitized at 2800° C. for 30 minutes under an inert atmosphere such as gaseous nitrogen/argon atmosphere. As a result, a carbon material having a graphite structure was prepared.

EXAMPLE 5

A coal tar pitch was dissolved in THF and insoluble components were removed therefrom. The residual components were heat-treated at 430° C. for 15 hours under a gaseous nitrogen atmosphere to thereby produce 98 weight percent of mesophase particles based on the pitch. Thereafter, the produced mesophase particles were heated at a rising temperature up to 600° C. under a gaseous nitrogen atmosphere to coke them. The coked mesophase particles were then carbonized at 1,100° C. under a gaseous nitrogen atmosphere. Next, the carbonized mesophase particles were graphitized at 2800° C. for 30 minutes under an inert atmosphere such as gaseous nitrogen/argon atmosphere. As a result, a carbon material having a graphite structure was prepared.

COMPARATIVE EXAMPLE 1

A coal tar pitch was dissolved in THF and insoluble components were removed therefrom. The residual components were heat-treated at 430° C. for a long time exceeding 15 hours under a gaseous nitrogen atmosphere to thereby produce mesophase particles. Thereafter, the produced mesophase particles were further heat-treated at 250~300° C. for 2 hours in air to stabilize them. The stabilized mesophase particles were then carbonized at 1,500° C. under a gaseous nitrogen atmosphere. Next, the carbonized mesophase particles were graphitized at 2800° C. for 30 minutes under an inert atmosphere such as gaseous nitrogen/argon atmosphere. As a result, a carbon material having a graphite structure was prepared.

COMPARATIVE EXAMPLE 2

A coal tar pitch was dissolved in THF and insoluble components were removed therefrom. The residual components were heat-treated at 430° C. for 15 hours under a gaseous nitrogen atmosphere to thereby produce 98 weight percent of mesophase particles based on the pitch. Thereafter, the produced mesophase particles were further heat-treated at 250~300° C. for 2 hours in air to stabilize them. The stabilized mesophase particles were then carbonized at 1,000° C. under a gaseous nitrogen atmosphere. As a result, a carbon material having carbonized mesophase particles were prepared.

In the comparative example 1, the graphite-like carbon material revealed a significantly high value of the intensity ratio $I(110)/I(002)$ so that the capacity of the battery made using the carbon material become greatly lower. Furthermore, in the comparative example 2, the carbon material did not present a peak of the (110) plane and the capacity of the battery made using the carbon material turned out to be significantly low.

Each of the graphite-like carbon materials having a different intensity ratio $I(110)/I(002)$, prepared according to the examples 1 to 5 of the present invention and the comparative example 1, is mixed with a solution of polyvinyliden fluoride (PVDF) in a N-methyl pyrrolidone (NMP) solvent to be thereby made into a slurry. Then, the slurry is coated on a collector made of copper foil to thereby form a negative electrode plate. Next, a lithium secondary cell was prepared using the negative electrode plate together with a counter electrode made of lithium metal foil and an electrolyte of $LiPF_6$ in an organic solvent. The capacity of each cell was measured and the results are presented in FIG. 1. In the figure, the alphabetic symbols a to f orderly indicate capacity and intensity ratio $I(110)/I(002)$ of lithium-based secondary cells according to Examples 4, 2, 3, 1 and 5, and Comparative Example 1, respectively. As can be know from FIG. 1, the cell made using the graphite-like carbon material having an intensity ratio $I(110)/I(002)$ of less than 0.2 reveals increase in charge/discharge capacity.

As described above, in the present invention, the graphite-like carbon material having an intensity ratio $I(110)/I(002)$ of less than 0.2 is used as the negative electrode active material so that the lithium secondary battery having a high capacity can be fabricated. Furthermore, the battery capacity can be measured without complicate experiments by adopting the intensity ratio $I(110)/I(002)$ as the capacity criterion for the negative electrode active material.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative electrode active material comprising a synthesized graphite-like carbon material having an X-ray diffraction peak intensity at a (002) plane and an X-ray diffraction peak intensity at a (110) plane and a positive intensity ratio $I(110)/I(002)$ of the X-ray diffraction peak intensity $I(110)$ at the (110) plane to the X-ray diffraction peak intensity $I(002)$ at the (002) plane of less than about 0.04.

2. A lithium secondary battery comprising:
    a positive electrode plate comprising a positive electrode material;
    a negative electrode plate comprising a negative electrode active material, the negative electrode active material comprising a synthesized graphite-like carbon material having an X-ray diffraction peak intensity at a (002) plane and an X-ray diffraction peak intensity at a (110) plane and a positive intensity ratio $I(110)/I(002)$ of the X-ray diffraction peak intensity $I(110)$ at the (110) plane to the X-ray diffraction peak intensity $I(002)$ at the (002) plane of less than about 0.04; and
    a separator positioned between the positive and negative electrode plates.

* * * * *

UNITED STATES PATENT AND TRADEMARK OFFICE
CERTIFICATE OF CORRECTION

PATENT NO.       : 7,662,513 B2                                           Page 1 of 3
APPLICATION NO.  : 09/792305
DATED            : February 16, 2010
INVENTOR(S)      : Choi et al.

It is certified that error appears in the above-identified patent and that said Letters Patent is hereby corrected as shown below:

On the Title Page

| | |
|---|---|
| Item (30) Foreign Application Priority Data | Insert -- (30) Foreign Application Priority Data<br><br>Aug. 28, 1997...........KR 97-41937 -- |
| Item (60) Related U.S. Application Data | Insert -- Related U.S. Application Data<br><br>(60) Continuation of application No. 09/143,271, filed on Aug. 28, 1998 now Pat. No. 6,245,460, Jun. 12, 2001 -- |

In the Specification

| | |
|---|---|
| Column 1, line 9 | Delete after "application" "claims priority to Korean patent application No. 97-41937 filed August 28, 1997, the content of which is incorporated herein by reference as if set forth in full." and replace with -- is a continuation of application No. 09/143,271, filed on August 28, 1998, which claims priority to No. 97-41937, filed August 28, 1997, the contents of which are incorporated herein by reference. -- |
| Column 1, line 19 | Delete "serving to fabricate" replace with -- useful for fabricating -- |
| Column 1, line 23 | Delete "the" and insert -- a -- |
| Column 1, line 25 | Delete "the" and replace with -- a -- |

Signed and Sealed this

Fifteenth Day of June, 2010

David J. Kappos
*Director of the United States Patent and Trademark Office*

CERTIFICATE OF CORRECTION (continued)
U.S. Pat. No. 7,662,513 B2

| | |
|---|---|
| Column 1, line 63 | Delete "the" and replace with -- use in a -- |
| Column 1, line 63 - line 64 | Delete "use can be divided into an" and replace with -- are generally -- |
| Column 1, line 64 | Delete "material" and replace with -- materials -- |
| Column 1, line 64 | Delete "a" |
| Column 1, line 65 | Delete "material" and replace with -- materials -- |
| Column 1, line 66 | Delete "the" and replace with -- an -- |
| Column 2, line 3 | Delete "the" and replace with -- a -- |
| Column 2, line 7 | Insert after "the" -- use of an -- |
| Column 2, line 8 | Delete first and second "the" and replace each with -- a -- |
| Column 2, line 9 | Delete "material" and replace with -- material, -- |
| Column 2, line 10 | Delete "trial has" and replace with -- attempts have -- |
| Column 2, line 15 | Delete "of" and replace with -- for -- |
| Column 2, line 16 | Delete "a" and replace with -- the -- |
| Column 2, line 27 | Delete "does" and replace it with -- do -- |
| Column 2, line 33 | Delete "serving to fabricate" and replace with -- useful for fabricating -- |
| Column 2, line 41 | Delete "of" and replace with -- for -- |
| Column 3, line 11 | Delete "of" and replace with -- for -- |
| Column 3, line 26 | Delete "by" and replace with -- in a yield of -- |
| Column 3, line 26 | Insert after "the" -- weight of the -- |
| Column 3, line 27 thru line 35 | Delete lines 27 thru 35 and replace with -- The stabilizing step is preferably performed at a temperature that is 20 to 30°C higher than the softening point of the mesophase particles. When the stabilizing step is performed at temperatures |

CERTIFICATE OF CORRECTION (continued)
U.S. Pat. No. 7,662,513 B2

| | |
|---|---|
| | exceeding 30°C higher than the softening point of the mesophase particles, the structure or component of the produced mesophase particles changes and entanglement among the particles occurs. On the contrary, when the stabilizing step is performed at a temperature less than 20°C higher than the softening point of the mesophase particles, deterioration in stabilizing efficiency results. -- |
| Column 3, line 42 | Delete "contrary" and replace with -- other hand -- |
| Column 3, line 44 | Delete "the" and replace with -- a -- |
| Column 3, line 49 | Delete "In case" and replace with -- When -- |
| Column 3, line 50 | Delete "case" |
| Column 3, line 52 | Delete "contrary" and replace with -- other hand -- |
| Column 3, line 56 | Delete "materials" and replace with -- material -- |
| Column 3, line 65 | Delete "in case" and replace with -- when -- |
| Column 4, line 8 | Delete "plane" and replace with -- plane, -- |
| Column 4, line 16 | Delete "drawing" and replace with -- drawings -- |
| Column 4, line 29 | Delete "are" and replace with -- were -- |
| Column 5, line 57 | Delete "the comparative example" and insert -- Comparative Example -- |
| Column 6, line 6 | Delete "examples" and replace with -- Examples -- |
| Column 6, line 6 thru line 7 | Delete "the comparative example 1, is" and replace with -- Comparative Example 1, was -- |
| Column 6, line 9 | Delete "is" and replace with -- was -- |
| Column 6, line 19 | Delete "know" and replace with -- seen -- |
| Column 6, line 19 | Delete "know" and replace with -- seen -- |